July 14, 1959

H. J. DE BRUIN 2,894,759

CHUCK FOR DRILL OR THE LIKE

Filed Nov. 25, 1957

2 Sheets-Sheet 1

Inventor
Hugo de Bruin by Parker & Carter
Attorneys

July 14, 1959 H. J. DE BRUIN 2,894,759
CHUCK FOR DRILL OR THE LIKE
Filed Nov. 25, 1957 2 Sheets-Sheet 2

INVENTOR.
HUGO de BRUIN
BY
Parker and Carter
ATTORNEYS.

US United States Patent Office 2,894,759
Patented July 14, 1959

2,894,759
CHUCK FOR DRILL OR THE LIKE

Hugo J. de Bruin, Sycamore, Ill., assignor to Ideal Industries, Inc., Sycamore, Ill., a corporation of Delaware Application November 25, 1957, Serial No. 698,562

12 Claims. (Cl. 279—97)

This is a continuation-in-part of Serial No. 685,914, filed September 24, 1957, now abandoned.

This invention is in the field of chucks or the like for releasably holding the shank of a drill bit in a drilling device, for example, an electric hand drill or the like. The invention is concerned with a simplified chuck which provides for easy insertion and removal of the drill bit but holds it rigidly during use. The device may be used with a rotary drilling device or with an impact unit or a combination thereof.

A primary object of my invention is a chuck structure for releasably holding the shank of a drill bit which provides for easy insertion and removal of the bit, but at the same time rigidly clamps it during use.

Another object is a chuck of the above type which provides maximum contact with the shank of the bit.

Another object is a chuck of the above type constructed for easy inspection and cleaning.

Another object is a chuck of the above type which is simple to assemble.

Another object is a chuck which is constructed for inspection to insure proper contact with the bit.

Another object is a chuck structure with a pivoted key, a rotatable actuating sleeve surrounding the key and an interlock between the key and sleeve.

Another object is a chuck which is simple and inexpensive to manufacture.

Another object is a chuck of the above type which is highly accurate and positive in operation.

Figure 1:
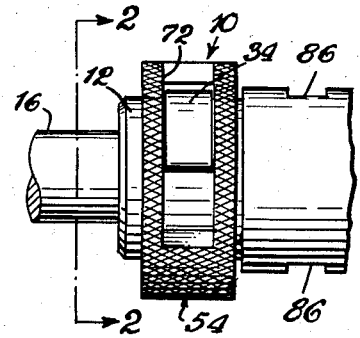
Figure 2:
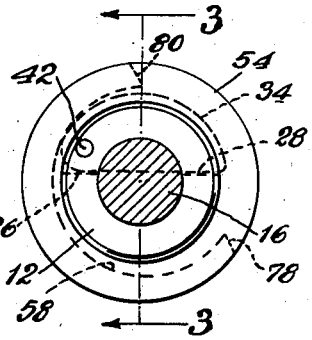
Figure 3:
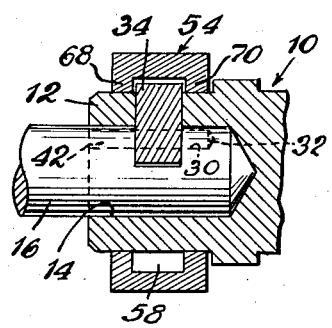
Figure 4:
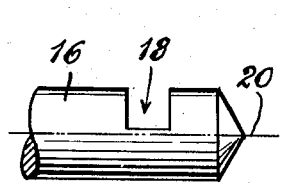
Figure 5:
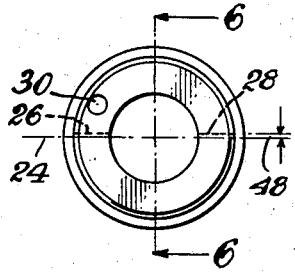
Figure 6:
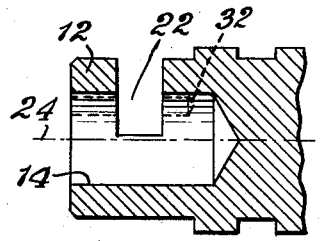
Figure 8:
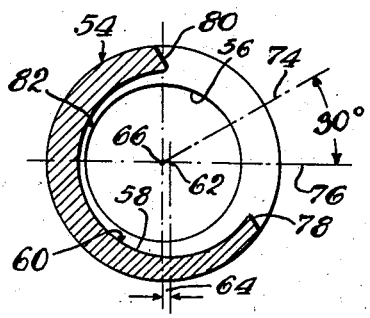
Figure 7:
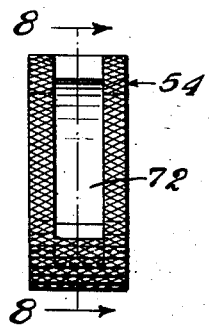
Figure 9:
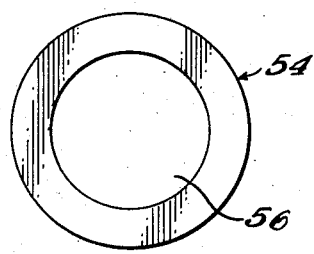
Figure 10:
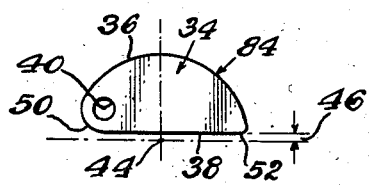
Figure 11:
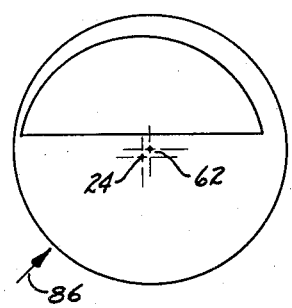
Figure 12:
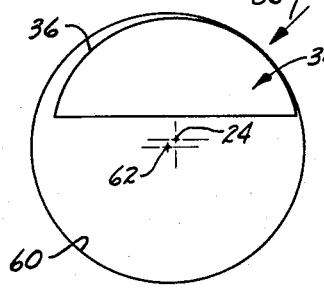
Figure 13:
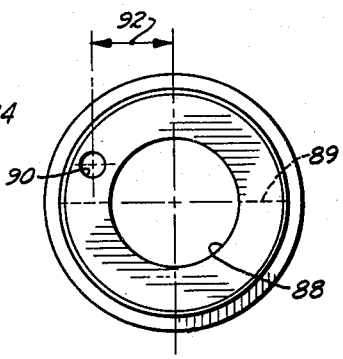
Figure 14:
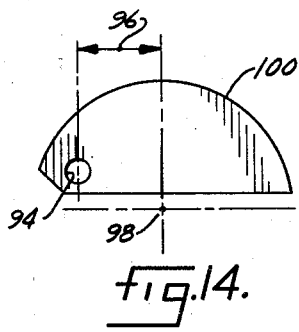
Figure 15:
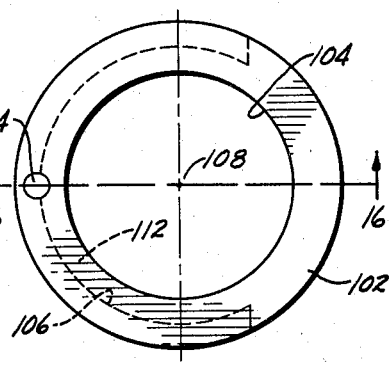
Figure 17:
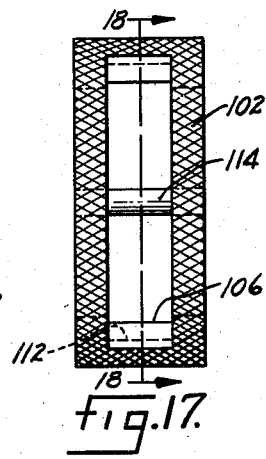
Figure 16:
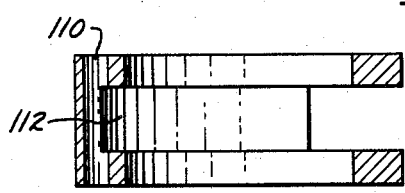
Figure 18:
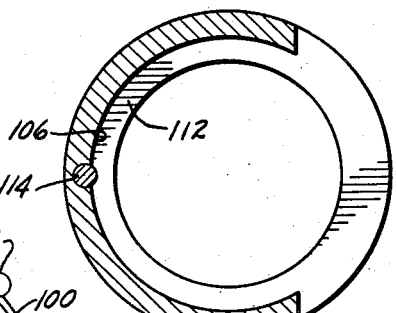
Figure 19:
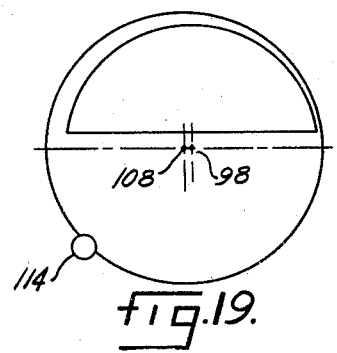
Figure 20:
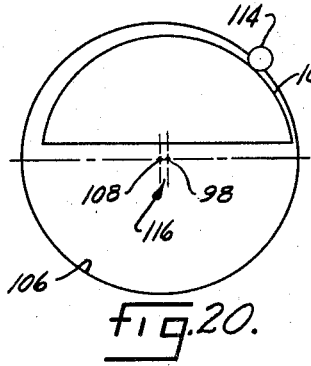

Other objects will appear from time to time in the ensuing specification and drawings in which:

Figure 1 is a side view of my chuck;
Figure 2 is a section along line 2—2 of Figure 1;
Figure 3 is a section along line 3—3 of Figure 2;
Figure 4 is a side view of the end of the drill bit shank;
Figure 5 is an end view of Figure 6;
Figure 6 is a section along line 6—6 of Figure 5;
Figure 7 is a side view of the locking collar;
Figure 8 is a section along line 8—8 of Figure 7;
Figure 9 is an end view of the locking collar;
Figure 10 is a side view of the locking dog or key;
Figures 11 and 12 are schematic end views of the operation of the chuck;
Figure 13 is an end view, similar to Figure 5, of a modified form;
Figure 14 is a side view of the locking dog or key for the modified form;
Figure 15 is an end view of the locking collar for the modified form;
Figure 16 is a section along line 16—16 of Figure 15;
Figure 17 is a side view of Figure 15;
Figure 18 is a section along line 18—18 of Figure 17; and
Figures 19 and 20 are schematic end views of the chuck's operation in the modified form.

In Figure 1 I have shown the end of what is intended to be a rotary drilling device, indicated generally at 10. It should be understood that this is intended to represent the chuck end of an electric drill or an impact device. Or it might be a combination device that simultaneously rotates and applies percussion blows to the drill bit such as in my copending application Serial No. 672,205, filed July 16, 1957, now abandoned.

In any event, it will be noted that the chuck end 12 has a generally cylindrical outer surface and a central bore 14 open at the front end for receiving the shank of a drill bit. A typical shank is shown at 16 which has a lateral slot 18 that terminates just above its center line 20. The diameter of the shank is approximately the same as or slightly less than the diameter of the bore 14, and if a substantially smaller diameter drill shank is used, a suitable bushing with a lateral slot may be slipped around the end of the shank.

The chuck is provided with a lateral slot 22 in Figure 6 which intersects the bore 14 and terminates slightly above the center line 24 of the chuck. The end surfaces 26 and 28 of the slot are generally coplanar and disposed slightly above the center line or central plane 24. The slot 22 may be formed by a simple milling operation or otherwise.

An axially disposed hole 30 may be drilled or otherwise suitably provided in the chuck opening at the front end. It should be noted that this hole extends across the lateral slot 22 and terminates in a portion at 32.

A key 34 is inserted in the lateral slot and has an arcuate outer surface 36 and a substantially flat inner surface 28. The key is almost half moon shaped and is provided with an axial hole 40 at one corner which is slightly larger in diameter than the hole 30 in the chuck. The key 34 is disposed in the lateral slot 22 and a suitable pin 42 is inserted from the front end of the chuck through the hole 40 in the key to the portion 32 to hold the key in place. The rear end of the pin will project into the rear end of the slot or hole at 32 so that the pin will straddle both sides of the key.

While I have referred to the key as being a half moon, it is not a full half moon and, as a matter of fact, the arcuate outer surface 36 is struck on an arc about a center 44 which is slightly below the flat surface 38. The key is pivotally mounted on the pin 42 and I prefer that the axial dimension of the key be slightly less than the axial dimension of the slot 22, for ease of movement. The distance 46 between the center 44 and the lower flat surface 38 is slightly greater than the distance 48 between the center 24 of the chuck and the end surfaces 26 and 28 of the lateral slot 22 to prevent binding between the end surface 26 and the well rounded end 50 of the key at the pivot 40. The radius of the arcuate outer surface 36 of the key about the center 44 is slightly greater than the radius of one-half the diameter of the outer surface of the chuck about its center 24. Thus, in the fully closed position of the key, when its end 52 remote from the pivot 40 contacts the end surface 28 of the lateral slot 22, a portion of the arcuate upper edge 36 will project above or outside of the outer surface of the chuck.

A sleeve 54 in the form of a ring with an open central bore 56 is positioned around the chuck and the inner surface of the bore has a channel or groove 58 which extends completely or continuously around the inner surface of the sleeve. As shown in Figure 8, the inner surface 60 of this channel is a circle described about a center 62 offset by a distance 64 from the center 66 of the sleeve. The channel or groove provides a pair of spaced inwardly disposed flanges 68 and 70 which, when the device is fully assembled, lie on each side of the key, as shown in Figure 3.

A lateral slot 72 is provided in the sleeve having approximately the same axial extent as the lateral slot 22 in the chuck. Since the axial dimension of the key is slightly less, it will freely pivot or otherwise move through the slot 72. For proper operation, I prefer that the slot 72 be milled or otherwise formed perpendicular to a radial line 74 disposed at approximately 30 degrees to a line 76 passing through the centers 62 and 64. By this relationship one edge or end surface 78 of the slot will be positioned at a deep part of the groove or channel 58 while the opposite edge 80 will be relatively close or disposed at a shallower part of the groove 58 but will, nevertheless, be open somewhat.

In Figures 11 and 12, I have shown schematically the operation of the sleeve and key with the center or axis of the bore of the chuck being designated 24, the eccentric inner surface of the channel at 60, the key at 34, and the arcuate outer surface of the key at 36, these being the same numerals as used hereinabove. Since the inner surface 60 of the channel is eccentric about its center 62, in the open position the high point of the eccentric surface, designated by the arrow 86, will be away from the key, as shown in Figure 11. But in Figure 12 the high point arrow 86 has been rotated until it contacts the key. It should be noted that the high point arrow 86 and the eccentric center 62 are on opposite sides of the center 24 of the bore about which the sleeve, as a unit, rotates.

In Figures 13 through 20, I have shown a variant form. In Figure 13 the front of the chuck is shown and a central bore 88 accepts the shank end of the drill bit. A lateral slot 89, shown in broken lines, is also cut, by milling or otherwise, across the chuck and intersects the bore throughout a substantial arcuate extent, shown in this form as 180°, to accept a pivoted key. As before, an axially disposed channel or hole is drilled through the chuck as at 90. Measured in a direction parallel to the bottom of the lateral slot 89 that accepts the key, this pin hole 90 is offset a distance 92 from the center line of the bore.

In Figure 14 I have shown a key for use in this modification which is in many respects similar to the key shown in detail in Figure 10 of the previous form. However, the hole 94 which accepts the pin and functions as a pivot is offset at the distance 96 from the center point 98 about which the arcuate outer or upper surface 100 is struck. The important point is that the distance 96 is slightly less than the distance 92. Since the pivot pin is driven through the channels or holes 90 and 94, this causes the point 98 of the arc 100 to be shifted slightly to one side of the center of the bore.

In Figures 15 through 17, I have shown a collar or sleeve 102 having an open central bore 104 to accept the front of the chuck shown in Figure 13. This sleeve is similar to the sleeve shown in Figures 7 through 9. The inner surface 106, while circular, is not struck on an arc or formed about a center eccentric to the axis of the sleeve, designated at 108. Rather, the surface 106 is formed about the axis 108 and is not eccentric throughout its entire area. I drill or otherwise form a passage 110 disposed axially through the sleeve which intersects the channel 112 in the sleeve, as shown in Figure 16. For example, I prefer that the axis or central point of this passage 110 lies slightly below the surface 106, although this is not critical. In any event, I insert a pin 114, screw or plug into this passage and swage, upset or otherwise secure it. As shown in Figure 15, a substantial portion of this pin will project into the channel 112, thereby forming a localized offset or eccentric to the outer arcuate surface 100 of the key.

In Figures 19 and 20, I have schematically shown the operation of this chuck, the same numerals being applied to the same parts. It will be noted that the center 98 about which the arcuate outer surface 100 of the key is struck is offset from the axis 108 of the sleeve's inner surface 106 by a distance 116, which is the difference between distances 92 and 96. As shown in these figures, the key is offset to the right, which forms an eccentric relationship between its outer surface 100 and the inner surface 106 of the sleeve. In Figure 19, the key is free and the contacting pin 114 has been rotated around to the bottom of the chuck. But in Figure 20 the sleeve has been rotated clockwise until the pin 114 engages the outer surface 100 of the key.

This has the distinct advantage that it is much easier to offset the key by a predetermined distance to effect the eccentric relationship rather than forming the inner surface of the sleeve eccentrically. Contact between the sleeve and the key is localized and restricted to the pin 114 which provides a positive and efficient locking action. When the shank of the drill bit is out, the key will rotate in fully and the pin 114 will not contact the surface 100. Thus, the sleeve may be rotated all the way around.

Manufacture is quite simple, the only criterion being to offset the key slightly by positioning its pivot pin 90 in an offset relation relative to the axis of the chuck and the slot laterally across the chuck such that the arcuate outer surface of the key will be eccentrically disposed relative to the concentric inner surface of the sleeve.

The use, operation and function of my invention are as follows:

The chuck structure is quite simple to operate but is totally reliable. In the Figures 1 through 10 form the drill bit is merely inserted and the sleeve rotated until the eccentric inner surface 60 of the channel or groove engages the key and forces it inwardly to grip the shank of the drill bit. To make sure that the slot 18 in the shank of the drill bit is properly positioned so that the key may freely enter, the sleeve may be rotated until the key pivots through the slot 72. This opens up the inside of the chuck and the operator may observe and properly position the slot 18. The sleeve is then rotated in the other direction and the forward edge 80 of the slot 72 in the sleeve will engage the key and force it down into engagement with the slot 18 in the drill shank. Further rotation of the sleeve causes the eccentric inner surface 60 of the sleeve to engage the projecting arcuate surface 36 on the key until a tight wedge fit is acquired. I prefer that the area designated generally at 82 on the inner surface 60 of the eccentric groove contacts generally the area designated 84 toward the opposite end 52 away from the pivot of the key so that maximum leverage will be provided.

The method of assembly is as follows: First, the sleeve is slipped onto the end of the chuck. The key is then inserted through the slot 72 into the slot 22 in the chuck. When the hole 40 in the key is properly aligned with the hole 30 in the chuck, the pin 42 is inserted and is suitably secured by upsetting or otherwise. The device is then fully assembled and the sleeve cannot be removed because the upper surface 36 of the key projects slightly above the slot 22 into the groove 58 in the sleeve. The inwardly disposed flanges 68 and 70 of the sleeve lie on each side of the key and are continuous. Thus, the key holds the sleeve in place. Even when the drill shank has been removed, the dimensioning is such that when the forward edge 52 of the key contacts the surface 28, the upper arcuate surface 36 will extend slightly above the surface of the shank and the sleeve will stay in place.

When a drill shank is not inserted in the chuck, the dimensioning is such that the sleeve may be rotated through 360 degrees without contacting the key. There is a slight clearance provided between the eccentric or offset circle 60 and the key but the dimensioning is such that when the drill shank is inserted, the key projects farther and always contacts the eccentric surface of the sleeve.

If grit, dirt and foreign material collect around the key so that it sticks, the forward corner 52 is well rounded. The sleeve may be rotated until that corner is exposed through the slot 72 and a suitable screw driver or any other prying device may be used to lift the key. Once the key is lifted slightly, the sleeve may be rotated until the forward edge 78 contacts the end 72 of the sleeve and further rotation will cam the key completely out of the slot.

I may provide suitable flats 86 on the chuck and corresponding flats on the sleeve, not shown, so that if a drill shank ever sticks in the chuck, I may put a wrench on both surfaces to break the jam.

In the form shown in Figures 13 through 20, the method of assembly is approximately the same and all of the advantages set forth hereinabove and characteristic features of the form of Figures 1 through 10 are retained. However, the manufacturing aspect is simplified since machining or grinding an eccentric surface in the sleeve may be expensive. Accordingly, I merely offset the pin or pivotal support for the key which makes the arcuate outer surface of the key the eccentric area which, upon rotation of the sleeve, contacts the pin which functions as a localized offset of the sleeve's inner surface.

While I have shown and described the preferred form and one modification, it should be understood that numerous additional modifications, changes, substitutions and alterations may be made without departing from the invention's fundamental theme. For example, the outer surface of the sleeve may be suitably knurled or otherwise formed to reduce slip and increase friction. The sizes are not important nor is any particular material necessary. The intended use, be it straight drilling or percussion work or a combination thereof, may be varied. With these and other changes in mind, I wish my invention unrestricted except as by the appended claims.

I claim:

1. In a chuck structure, a chuck having a generally central bore for receiving the shank of a drill bit, a lateral slot across the chuck intersecting the bore over a substantial peripheral extent, a key in the slot on an axially disposed pivot, at least a portion of the outer surface of the key projecting outside of the chuck when the key is fully closed, a sleeve rotatably mounted on the chuck with an internal channel accepting the key, the sleeve having an inwardly disposed circular flange on each side of the channel of less radius than the radial extent of the key in its closed position, and an eccentric area between the inner surface of the channel and the outer surface of the key.

2. The structure of claim 1 in which the eccentric area is an offset circle formed on the inner surface of the channel.

3. The structure of claim 1 in which the eccentric area includes a pin inserted through the internal channel in the sleeve.

4. In a chuck structure, a generally cylindrical chuck having a generally central bore for receiving the shank of a drill bit, a lateral slot across the chuck intersecting the bore over a substantial peripheral extent, a key in the slot on an axially disposed pivot, the outer surface of the key projecting out of the slot when the key is pivoted in completely, a sleeve rotatably mounted on the chuck and having a central bore closely fitted to the cylindrical exterior of the chuck, an internal channel in the bore of the sleeve accepting the key, and an eccentric portion between the key and sleeve to engage the key and pivot it inwardly when the sleeve is rotated.

5. The structure of claim 4 in which the eccentric area is an offset circle in the internal channel of the sleeve, and further including a lateral slot in the sleeve intersecting the channel of approximately the same axial extent as the lateral slot in the chuck, the center of the eccentric area being offset in the direction toward the slot in the sleeve.

6. The structure of claim 4 further characterized in that the radial extent of the key, the depth of the lateral slot in the chuck, and the diameter of the channel in the sleeve are such that when the shank of a drill bit is not inserted in the bore of the chuck and the key is fully closed, the sleeve may be rotated through 360 degrees without the sleeve contacting the key.

7. The structure of claim 4 in which the key has an arcuate outer surface and a generally flat inner surface with the axial pivot at one end of the key, the center of curvature of the key's arcuate outer surface being eccentrically disposed remote from its pivot relative to the axis of the bore of the chuck.

8. The structure of claim 4 in which the eccentric portion in the inner surface of the channel includes a pin inserted through the channel in the sleeve.

9. In a chuck structure, a chuck having a generally central bore for receiving the shank of a drill bit, a lateral slot across the chuck intersecting the bore over a substantial peripheral extent, a key in the slot on an axially disposed pivot and having an arcuate outer surface struck about a center eccentrically disposed remote from its pivot relative to the axis of the chuck bore, and a sleeve rotatably mounted on the chuck with an eccentric area between the inner surface of the sleeve and the outer surface of the key.

10. The structure of claim 9 further characterized in that the eccentric area includes a pin inserted through the sleeve.

11. The structure of claim 1 characterized by a lateral slot in the sleeve between the flanges and intersecting the internal channel through which the key may pivot when the sleeve slot is aligned with the key, the key being pivoted at one end and having an arcuate outer surface and a generally flat inner surface.

12. The structure of claim 9 wherein the sleeve includes an internal channel accepting the key, inwardly disposed circular flanges on each side of the channel of less radius than the radial extent of the key, and a lateral slot in the sleeve through which the key may pivot when the sleeve slot is aligned with the key.

References Cited in the file of this patent

UNITED STATES PATENTS

| | | |
|---|---|---|
| 646,489 | Cook | Apr. 3, 1900 |
| 799,787 | Gessert | Sept. 19, 1905 |
| 1,380,912 | Jacques | June 7, 1921 |